March 25, 1930.  C. W. NELSON ET AL  1,751,859
OIL HEATER FOR CRANK CASES
Filed April 20, 1929
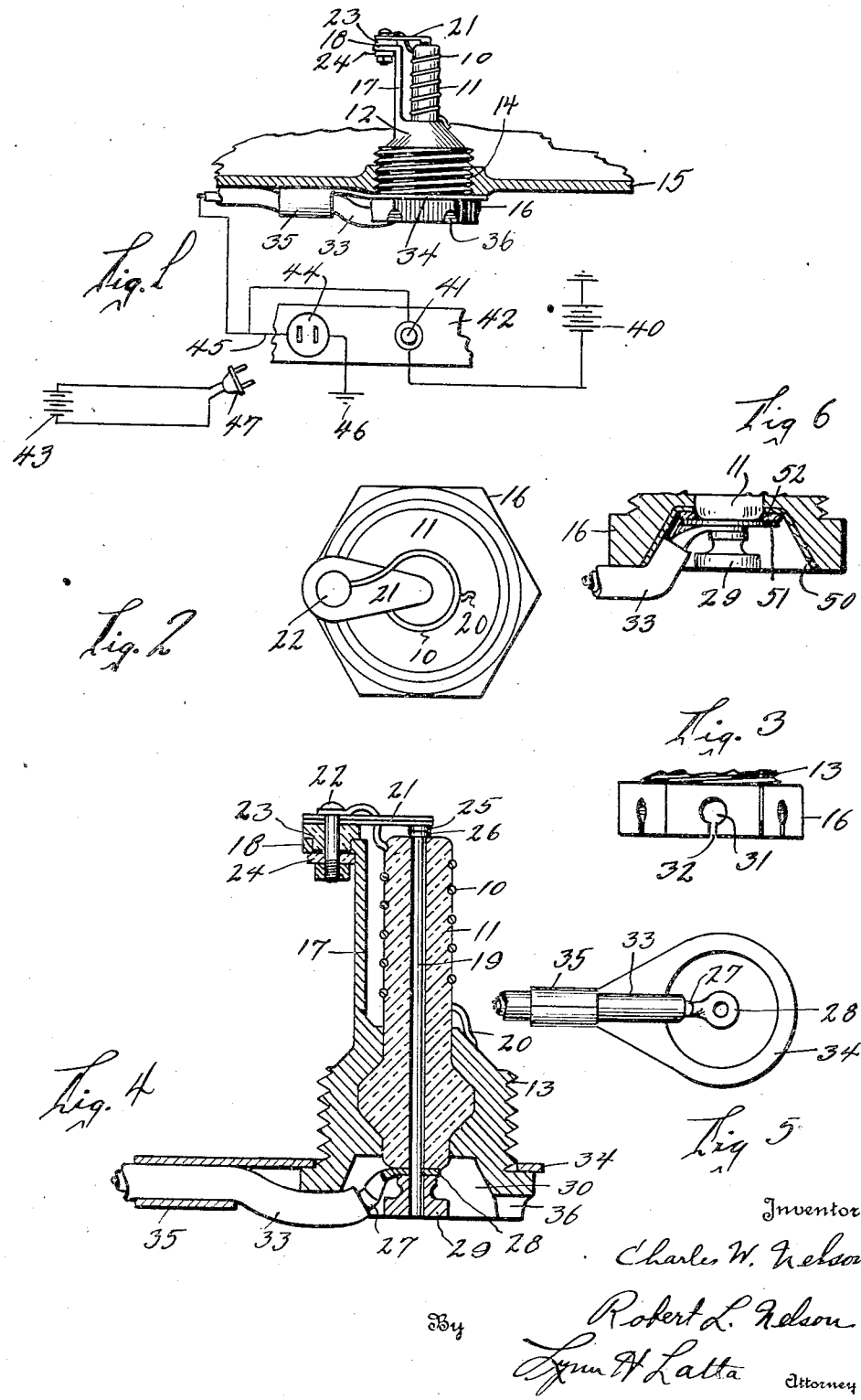
Inventors
Charles W. Nelson
Robert L. Nelson
By Lynn H. Latta  Attorney Patented Mar. 25, 1930

1,751,859

UNITED STATES PATENT OFFICE

CHARLES W. NELSON AND ROBERT L. NELSON, OF SIOUX CITY, IOWA, ASSIGNORS TO NELSON BROS. MFG. CO., INC., A CORPORATION OF IOWA

OIL HEATER FOR CRANK CASES

Application filed April 20, 1929. Serial No. 356,708.

Our invention relates to a device for heating the oil in the crank case of an automotive vehicle for winter starting purposes and our primary object is to provide a device of this type which is attachable without any alteration whatever in the crank case of the vehicle to which the device is to be applied.

We are aware that many devices for heating the oil in crank cases have already been invented and we do not intend to claim broadly a device for this purpose whether heated by one means or another.

Our invention resides primarily in the providing of a device which may be constructed simply and in an inexpensive manner and which may be attached to the crank case by merely removing the drain plug of the crank case.

To be more specific, it is our purpose to solve the problem of a simple, inexpensive and readily attachable heating device by providing an electrical heating coil in the form of a plug adapted to be screwed in the threaded drain opening of the crank case.

Another object of our invention is to provide a heating plug of this nature which may be connected to and energized from the storage battery of the vehicle with a single current carrying wire.

Another object is to provide a device of this kind which includes an automatic cutout to open the circuit to the plug when the temperature of the oil has reached a predetermined degree.

Our invention further contemplates means for connecting the plug to an external circuit such as the lighting circuit of a garage in order that the plug may be energized without draining the current from the storage battery when such an external source of current is available.

A further object is to provide means for protecting the plug and its current carrying wire from damage through contact with obstacles in the road when the vehicle is being driven. This object is accomplished first by building the plug with all of its parts enclosed within a solid integral head which is provided primarily for the purpose of enabling the plug to be engaged by a wrench and secondly by some means for protecting the current carrying wire where it enters the plug.

With these and other objects in view, our invention consists in the construction, arrangement and combination of the various parts of our device, whereby the objects contemplated are attained, as hereinafter more fully set forth, pointed out in our claims, and illustrated in the accompanying drawings, in which:

Fig. 1 is a view partly in section, partly in elevation and partly in diagram of a portion of the crank case of an automobile with our invention installed therein of a portion of the dash of said automobile and the electrical circuit including the plug circuit and an external source of current.

Fig. 2 is a plan view of the plug.

Fig. 3 is a view of a modified form of the head of the plug.

Fig. 4 is a detail, enlarged, sectional view of the plug.

Fig. 5 is a plan view of the end of the current carrying wire and its protective device.

Fig. 6 is a detail, sectional view of a portion of the plug and a current carrying wire illustrating a somewhat modified form of the protective device.

The problem of starting an automotive engine in extremely cold weather is well appreciated by everyone who has had occasion to drive an automobile in such weather and one of the most serious features of this problem is the possible injury to an engine from a frozen oil pump. It will be understood that the stopping of an oil pump from freezing occurs from the congealing of moisture on the screen of the oil pump and the worst aspect of this problem can be removed by melting the ice from the screen sufficiently to allow the oil to pass through.

With a circulation of oil through the screen, the parts will receive oil from the pump and although the oil may still be somewhat heavy, the danger of burning out bearings is eliminated where the pump is operated.

We have discovered that the heat from a small coil contained within a plug which can be screwed through the drain opening of a crank case is sufficient to remove the ice from the oil pump screen in about two minutes' time in the ordinary case. The particular efficacy of our heating device in this connection arises from the fact that in every engine the drain opening is positioned in the lowest portion of the crank case and the pump is likewise positioned as low in the crank case as possible.

Consequently the drain opening and pump are always very close to each other and our device takes advantage of this fact in thawing out the oil pump in a minimum length of time and with a minimum requirement of electrical energy.

The heating coil is indicated in the drawings by the reference character 10 and comprises a bare wire, mounted upon a post 11 of porcelain or any other insulating material having sufficient strength and rigidity to withstand the vibration of an internal combustion engine. One end of the post 11 is mounted in a casing 12 of cast iron or the like which is threaded at 13 so as to be receivable within the threaded boss 14 of the crank case 15 of an internal combustion engine.

The boss 14 is of course the boss which surrounds the drain opening of the crank case. The casing 12 is provided with a hexagonal or polyhedral head 16 to which a wrench may be applied for tightening the plug in the drain opening. The opposite end of the casing is extended to form an arm 17 which parallels the post 11 and which at its upper end is extended transversely as at 18.

Extending through the axis of the post 11 is a shaft 19 of conducting material.

The coil 10 is grounded at one end as at 20 to the casing 12 and at its other end it is connected to the fixed end of a thermostatic lever 21, as by means of the bolt 22, which secures the thermostatic lever 21 to the extension 18 of the arm 17.

The bolt 22 is insulated from the arm 17 by means of washers 23 and 24 of fibre or the like.

Contact between the thermostatic bar 21 and the shaft 19 is normally made through the medium of contact points 25 and 26, carried by the thermostatic bar and shaft 19, respectively.

Current is carried through the conducting shaft 19 by means of a current carrying wire 27, which may be provided with the usual terminal 28 to receive the end of the shaft 19 and to be held in place by a terminal nut 29, threaded onto the end of the shaft 19.

The terminal 28 and the terminal nut 29 are protected within the cavity 30, formed in the head 16 so that they may not be struck by any obstacles encountered by the crank case while driving.

It will be seen however that it is practically necessary to bring the wire 27 below the level of the head 16 and we have provided means for protecting the wire 27 also against injury from such obstacles. It will be understood that the wire 27 might be brought through a suitable depression extended laterally through the head 16, as indicated in Fig. 6 of the drawing at 31. Such an opening might be provided with a slot 32 to accommodate the terminal 28 in inserting the wire in the opening. It would be necessary of course to provide a series of openings as shown in Fig. 6 in order that the plug might be threaded into the crank case first and the wire then brought through the opening which extends rearwardly from the plug toward the center of the car.

It will be seen that this expedient would obviate the necessity of bringing the wire below the level of the head 16.

However, we prefer to employ the construction shown in Fig. 3 or Fig. 5, in which the wire is encased in a metallic sheath 33, adapted to be curved under the head 16 and up into the cavity 30. The casing 33 is then secured to the plug by means of a ring 34, adapted to encircle the plug as shown and provided with an integral sleeve 35, into which the sheath 33 is either soldered or welded. The ring 34 thus serves to withstand any pull against the sheathing that might be occasioned by contact with the ground or with an obstacle and such pull is transmitted directly to the plug instead of to the shaft 19 and wire 27, neither of which is constructed strongly enough to receive such a heavy strain without injury to the mechanism.

The sheath 33 may be received within a slot 36 in the head so as to reduce the amount which projects below the head 16 but it will be understood that our invention contemplates either this construction or the curving of the sheath entirely below the head and elimination of the slots 36.

It will be seen that in order to remove the plug, it is only necessary to loosen the terminal nut 29 to allow a slight clearance between the lower surface of the head 16 and the sheath 33 and to then apply a wrench to the plug and rotate it until it is completely unthreaded. During the unthreading process the plug and shaft 19 will rotate within the ring 34 and the terminal 28, respectively, and the position of the current carrying wire need change only to the extent of dropping downwardly.

It will be understood that the thermostatic control is set so that under normal driving temperatures the thermostat will be open whereas under temperatures substantially below normal driving temperatures it will be closed. For instance, the thermostat may be set to open at approximately one hundred degrees.

The current carrying wire 27 is connected directly to the storage battery 40 of the vehicle through the medium of a switch 44, located upon the dash or instrument panel 42. The switch 41 is preferably in the form of a push button so that it is necessary for the operator to engage the switch constantly as long as current is desired for the heating plug.

The external source of current is indicated roughly by the reference character 43 in Fig. 1 and may be either an alternating or direct current circuit such as a lighting circuit or the like and my invention contemplates the provision of a plug socket 44, located on the instrument panel or dash 42 and connected at one side to the wire 27 as at 45 and grounded at the other side as at 46.

An ordinary plug 47 hooked into the circuit 43 may then be employed to coact with the plug socket 44 to plug in the heating device circuit into the external circuit 43. It is thought that it is evident from the diagram that current may thus be conveyed directly to the heating plug from the external circuit as long as the plug 47 is in the socket 44. It will be understood that the ground 46 is the ground to the frame of the vehicle.

The device of our invention not only utilizes the advantage of proximity to the oil pump by extending the heating element through the oil drain opening but also utilizes the capacity of the oil within the crank case to act as an insulating agent to protect the bare wire of the coil not only against any possible shorting of said wire but also against overheating and the consequent burning out of the coil. Thus it will be seen that little attention need be paid to the danger of burning out the coil.

It is of course known that in the case of spark plugs, oil often causes the shorting of the points of a spark plug rather than insulating them against shorting but in that case the shorting is caused not by the pure oil but by the carbon which that oil produces. In the case of the pure oil in the crank case, a very good insulator is provided for the unprotected and exposed coil and there is no necessity for any other protective means being provided.

Instead of the device shown in Fig. 5, the same result may be accomplished by the somewhat modified form shown in Fig. 6. In place of the ring 34, we provide a cup 50, to which the end of the sheathing 33 is permanently secured, the sheathing being held in place by a washer 51, secured by the terminal nut 29 and a washer 52, which insulates the sheathing from the terminal nut.

Some changes may be made in the construction and arrangement of the parts of our invention without departing from the real spirit and purpose of our invention, and it is our intention to cover by our claims, any modified forms of structure or use of mechanical equivalents, which may be reasonably included within their scope.

We claim as our invention:

1. In an oil heater for a crank case having a threaded drain opening, a threaded plug receivable in said opening, an exposed heating coil supported by the plug and insulated therefrom except at one end, said end being grounded to the plug, and means insulated from the plug, to connect the other end of the coil to a source of current, said means including a thermostatic switch, adapted to be surrounded by the body of oil, and to open at a predetermined maximum temperature of said oil.

2. In an oil heater for a crank case having a threaded drain opening, a threaded plug receivable in said opening, a heating element supported by the plug and insulated therefrom except at one end, said end being grounded to the plug, a binding post insulated from the plug and connected to the other end of said element, a current-carrying wire provided with an end portion to receive said binding post and a binding post nut to secure said end portion, the plug being provided with a cavity in which said nut is received and protected from obstacles over which the crank case may be passing.

3. In an oil heater for a crank case having a threaded drain opening, a threaded plug receivable in said opening, a heating element supported by the plug and insulated therefrom except at one end, said end being grounded to the plug, means insulated from the plug, to connect the other end of the element to a source of current, said means including a terminal to secure a current carrying wire, the plug being provided with a cavity in which said terminal is received and protected from contact with obstacles over which the crank case may be passing, a current carrying wire connected to the plug by said terminal, and a sheath in which part of said wire is received, said sheath being connected to the plug by means of a device relatively to which the plug is rotated.

4. In an oil heater for an oil container, a plug adapted to be extended through the bottom of the container so that a portion of the plug extends within the container, an exposed heat element supported by said portion and insulated therefrom except at one end, said end being grounded to the plug, and means insulated from the plug, to connect the other end of the element to a source of current, said means including a thermostatic switch, adapted to be surrounded by the body of oil, and to open at a predetermined maximum temperature of said oil.

5. In an oil heater for a crank case having a threaded drain opening, a threaded plug receivable in said opening, a heating element supported by the plug and insulated therefrom except at one end, said end being grounded to the plug, means insulated from the plug, to connect the other end of the element to a source of current, said means including a terminal, the plug being provided with a cavity in which said terminal is received and protected from contact with obstacles over which the crank case may be passing, a current carrying wire connected to the said terminal, the portion of the plug surrounding said cavity being provided with a radial depression in which said current-carrying wire is received as it passes from the cavity to the exterior of the plug, the plug serving thereby to protect the current-carrying wire against injury from obstacles over which the crank case may be passing.

6. In an oil heater for a crank case having a threaded drain opening, a threaded plug receivable in said opening, a heating element supported by the plug and insulated therefrom except at one end, said end being grounded to the plug, means insulated from the plug to connect the other end of the element to a source of current, said means including a terminal, the plug being provided with a cavity in which said terminal is received and protected from contact with obstacles over which the crank case may be passing, a current-carrying wire connected to said terminal, that portion of the plug surrounding the cavity being provided with a plurality of radially disposed depressions, in one of which the current-carrying wire is received as it passes from the cavity to the exterior of the plug, the plug serving to protect the wire from obstacles over which the crank case may be passing.

7. In an oil heater for a crank case having a threaded drain opening, a threaded plug receivable in said opening, a heating element supported by the plug and insulated therefrom except at one end, said end being grounded to the plug, means insulated from the plug to connect the other end of the element to a source of current, said means including a current carrying wire, and a polyhedral head formed on the plug, said head being provided with a series of radial depressions, the current carrying wire being extended from the exterior of the head to the axis of the plug and protected in one of said depressions against the injury from obstacles over which the crank case may be passing.

8. In an oil heater for a crank case having a threaded drain opening, a threaded plug receivable in said opening, a heating element supported by the plug and insulated from it at one end, said end being grounded to the plug, means insulated from the plug to connect the other end of the element to a source of current, said means including a current carrying wire, the plug being provided with a head having a radial depression and the current carrying wire being extended through said radial depression from the exterior of the head to the axis of the plug and thereby protected against injury from obstacles over which the crank case may be passing.

9. In an oil heater for a crank case having a threaded drain opening, a threaded plug receivable in said opening, a heating element supported by the plug and insulated therefrom except at one end, said end being grounded to the plug, means insulated from the plug to connect the other end of the element to a source of current, said means including a current carrying wire, the plug being provided with a head having a plurality of radial depressions, the current carrying wire being extended from the exterior of the head to the axis of the plug, and received in one of said radial depressions and thereby protected against injury from obstacles over which the crank case may be passing.

10. In an oil heater for a crank case having a threaded drain opening, a threaded plug receivable in said opening, a heating element supported by the plug and insulated at one end from the plug, said end being grounded to the plug, means to connect the other end of the element to a source of current, said means including a terminal, the plug being provided with a cavity in which said terminal is received and protected from contact from obstacles over which the crank case may be passing.

11. In an oil heater for a crank case having a threaded drain opening, a threaded plug receivable in said opening, a heating element supported by the plug and insulated therefrom except at one end, said end being grounded to the plug, means insulated from the plug to connect the other end of the element to a source of current, said means including a terminal to secure a current carrying wire, the plug being provided with a cavity in which said terminal is received and protected from contact with obstacles over which the crank case may be passing, a current carrying wire connected to the plug by said terminal, and a sheath in which part of said wire is received, said sheath being connected to the plug by means of a member adapted to embrace the plug and to receive support therefrom.

Signed this 28th day of March, 1929, in the county of Woodbury and State of Iowa.

CHARLES W. NELSON.
ROBERT L. NELSON.